(12) United States Patent
Cattan et al.

(10) Patent No.: US 10,481,964 B2
(45) Date of Patent: *Nov. 19, 2019

(54) MONITORING ACTIVITY OF SOFTWARE DEVELOPMENT KITS USING STACK TRACE ANALYSIS

(71) Applicant: SafeDK Mobile Ltd., Herzliya (IL)

(72) Inventors: Ariel Cattan, Raanana (IL); Idan Mandil, Shaar Efraim (IL); Eldad Moneta, Givataim (IL)

(73) Assignee: SAFEDK MOBILE LTD., Herzlia (IL)

( * ) Notice: Subject to any disclaimer, the term of this patent is extended or adjusted under 35 U.S.C. 154(b) by 0 days.

This patent is subject to a terminal disclaimer.

(21) Appl. No.: 16/012,875

(22) Filed: Jun. 20, 2018

(65) Prior Publication Data

US 2018/0300222 A1 Oct. 18, 2018

Related U.S. Application Data

(63) Continuation of application No. 15/389,431, filed on Dec. 22, 2016, now Pat. No. 10,025,694.

(51) Int. Cl.
*G06F 9/44* (2018.01)
*G06F 11/07* (2006.01)

(52) U.S. Cl.
CPC .................. *G06F 11/0742* (2013.01)

(58) Field of Classification Search
CPC .................. G06F 11/0742; G06F 11/0745
USPC .................. 717/124–130, 140–141
See application file for complete search history.

(56) References Cited

U.S. PATENT DOCUMENTS

| 6,721,941 B1 * | 4/2004 | Morshed | G06F 11/3612 709/217 |
| 6,760,903 B1 * | 7/2004 | Morshed | G06F 11/3466 717/130 |
| 6,948,162 B2 * | 9/2005 | Kalogeropulos | G06F 8/445 717/128 |
| 7,080,359 B2 * | 7/2006 | Ullmann | G06F 9/4484 717/128 |
| 7,386,686 B2 * | 6/2008 | Wu | G06F 8/443 711/147 |

(Continued)

OTHER PUBLICATIONS

Hayashizaki et al, "Improving the Performance of Trace-based Systems by False Loop Filtering", ACM, 405-418 (Year: 2011).*

(Continued)

*Primary Examiner* — Anil Khatri

(57) ABSTRACT

Method, product and system for analyzing an execution of a program which uses Software Development Kits (SDKs), wherein the program is configured to invoke execution units, wherein a portion of the execution units are SDK execution units that are comprised by the SDKs. The method comprises: obtaining a stack trace of the execution of the program, wherein the stack trace comprises addresses of execution units; iterating over the stack trace to identify an address of an SDK execution unit, wherein said iterating comprises: comparing an address from the stack trace to a set of addresses associated with SDK execution units; and in response to determining the address is comprised by the set of address, identifying the address as an address of the SDK execution unit; and sending a report to a server, wherein the report identifies an SDK comprising the SDK execution unit.

10 Claims, 7 Drawing Sheets

(56) References Cited

U.S. PATENT DOCUMENTS

| | | | | |
|---|---|---|---|---|
| 7,441,234 B2 * | 10/2008 | Cwalina | ............. | G06F 11/3466 |
| | | | | 714/E11.2 |
| 7,600,221 B1 * | 10/2009 | Rangachari | ........... | G06F 9/3808 |
| | | | | 712/215 |
| 8,127,280 B2 * | 2/2012 | Thomas | ................ | G06F 8/4442 |
| | | | | 717/136 |
| 8,286,134 B2 * | 10/2012 | Jones | ................ | G06F 11/3612 |
| | | | | 717/124 |
| 8,418,126 B2 * | 4/2013 | Chaar | ................... | G06Q 10/06 |
| | | | | 717/104 |
| 8,533,678 B2 * | 9/2013 | Halter | ................ | G06F 11/3648 |
| | | | | 712/227 |
| 8,667,473 B2 * | 3/2014 | Goossen | ................ | A63F 13/10 |
| | | | | 717/131 |
| 8,788,569 B2 * | 7/2014 | Griffiths | ............... | G06F 9/5055 |
| | | | | 707/E17.055 |
| 8,806,434 B2 * | 8/2014 | Amrhein | ................... | G06F 8/71 |
| | | | | 715/762 |
| 8,924,935 B1 * | 12/2014 | Chopra | ..................... | G06F 8/71 |
| | | | | 717/120 |
| 9,009,539 B1 * | 4/2015 | Kompotis | ........... | G06F 11/3636 |
| | | | | 714/38.1 |
| 9,128,973 B1 * | 9/2015 | Murugesan | ......... | G06F 16/2358 |
| 9,436,533 B2 * | 9/2016 | Hermany | ............ | G06F 11/0742 |
| 9,529,589 B2 * | 12/2016 | Gu | ........................... | G06F 8/41 |
| 10,185,611 B2 * | 1/2019 | Hermany | ............ | G06F 11/3476 |

OTHER PUBLICATIONS

Li et al, "Compiler Directed Automatic Stack Trimming for Efficient Non-Volatile Processors", ACM, pp. 1-6 (Year: 2015).*

Ponzanelli et al, "StORMeD: Stack Overflow Ready Made Data", IEEE, pp. 474-477 (Year: 2015).*

Theisen et al, "Approximating Attack Surfaces with Stack Traces", IEEE, pp. 199-208 (Year: 2015).*

Hofer et al, "Lightweight Java Profiling with Partial Safepoints and Incremental Stack Tracing", ACM, pp. 75-86 (Year: 2015).*

Jiang et al, "Fault Localization for Null Pointer Exception Based on Stack Trace and Program Slicing", IEEE, pp. 9-12 (Year: 2012).*

* cited by examiner

MONITORING ACTIVITY OF SOFTWARE DEVELOPMENT KITS USING STACK TRACE ANALYSIS

TECHNICAL FIELD

The present disclosure relates to usage of third party components within a program in general, and to monitoring of the activity resulted from integration of Software Development Kits (SDKs) in a program, in particular.

BACKGROUND

Mobile computing devices, such as advanced cellular telephones running a full-fledged operating system, colloquially termed "smartphones", tablet computers, and the like, are becoming more and more ubiquitous and in widespread use.

Features of mobile computing devices typically include a multi-touch screen as the main form of user interaction, network connectivity and a variety of sensors, such as cameras, microphones, accelerometers, Global Positioning System (GPS) receivers, and the like.

In recent years, mobile computing devices are serving as an ever increasingly popular target platform for application programs ("apps") development. Developers of application programs for mobile computing devices may conserve time and resources by using pre-existing software components providing certain desired functionalities, such as Software Development Kits (SDKs) currently available from multiple vendors.

In today's world where mobile apps have become vastly popular, the use of third-party SDKs has become an essential need of almost every app out there. Developers use third-party SDKs for many reasons—for advertisements, analytics, payments, social networks, location services, crash reporting, attribution and many more. In fact, apps today use more than 15 SDKs on average.

BRIEF SUMMARY

One exemplary embodiment of the disclosed subject matter is a computer program product for analyzing an execution of a program, wherein the program is configured to use one or more Software Development Kits (SDKs), wherein the program is configured to invoke execution units, wherein a portion of the execution units are SDK execution units that are comprised by the one or more SDKs, wherein the computer program product comprising a non-transitory computer readable storage medium retaining program instructions, which program instructions when read by a processor, cause the processor to perform a method comprising: obtaining a stack trace of the execution of the program, wherein the stack trace comprises addresses, each address is an address of an execution unit by the program having the address; iterating over the stack trace to identify an address of an SDK execution unit, wherein said iterating comprises: comparing an address from the stack trace to a predetermined set of addresses associated with SDK execution units; and in response to determining the address is comprised by the predetermined set of address, identifying the address as an address of the SDK execution unit; and sending a report to a server, wherein the report identifies an SDK comprising the SDK execution unit, wherein the report is accessible to a developer of the program.

Optionally, the stack trace is a stack trace depicting a state of the execution that lead to the program crashing; wherein the report comprises a crash report, whereby the server gathering from a plurality of instances of the program, crash reports accessible to the developer, whereby SDK-caused crashes are identifiable to the developer.

Optionally, the stack trace is a stack trace depicting a state of the execution prior to accessing a resource of a computation platform executing the program; wherein the report comprises information regarding resource consumption by the SDK, whereby SDK resource consumption is monitored, whereby the server maintaining an aggregated SDK resource consumption report that is accessible to the developer.

Optionally, the predetermined set of addresses associated with SDK execution units are determined at build-time of the program, wherein at build-time, a symbol table and an executable file of the program are analyzed to identify the execution units, wherein each execution unit is analyzed, based on a corresponding symbol of the execution unit, to determine to which SDK the execution unit is associated, if any, wherein the predetermined set of addresses comprises addresses of execution units identified as SDK execution units during build-time.

Optionally, said iterating comprises: before performing said comparing, querying a hash table to determine if the address is in the hash table, wherein in response to a determination that the address is in the hash table, obtaining from the hash table, an identification of the SDK, whereby the address is identified as an address of the SDK execution unit without comparing the address with the predetermined set of addresses, whereby reducing overhead of said iterating.

Optionally, in response to said determining the address is comprised by the predetermined set of addresses, adding the address to a hash table together with an identification of the SDK.

Optionally, two SDK execution units of two different SDKs can potentially have a same name, whereby a name of an SDK execution unit is insufficient to uniquely identify an SDK comprising the execution unit.

Optionally, said iterating is performed in a Last-In First-Out (LIFO) order, wherein said iterating comprises: skipping an address of a system call in the stack trace.

Another exemplary embodiment of the disclosed subject matter is a method for preparing a program for analysis, wherein the program is configured to use one or more Software Development Kits (SDKs), wherein the program is configured to invoke execution units, wherein a portion of the execution units are SDK execution units that are comprised by the one or more SDKs, wherein said method comprising: obtaining symbols of execution units that are potentially invoked by the program during execution; querying, using the symbols, an SDK database to identify the SDKs used by the program; and compiling a set of addresses within the executable that are attributable to the one or more SDKs, wherein each address is identified as associated to a particular SDK; whereby during execution of the program, a stack trace of the execution can be analyzed and addresses obtained therefrom compared to the set of addresses in order to identify an SDK execution unit and its corresponding SDK.

Optionally, said obtaining symbols comprises obtaining a debug symbols file created during compilation of the program.

Optionally, the debug symbols file comprises ranges of addresses of compilation units, wherein a compilation unit comprises one or more execution units.

Optionally, the symbols comprise a name of an execution unit, wherein the SDK database comprises two SDKs that comprise an execution unit having the name, wherein said method comprises: heuristically selecting between the two SDKs, wherein said heuristically selecting is based on a determination of which other execution units of each of the two SDKs are comprised by the program.

Optionally, the symbols comprise a name of an execution unit, wherein the SDK database comprises two SDKs that comprise an execution unit having the name, wherein said method comprises: comparing program instructions of the execution unit in the program with program instructions of corresponding execution units of the two SDKs to identify to which SDK the execution unit belongs.

Optionally, the SDK database is automatically maintained, wherein in response to an identification of a new SDK in an SDK repository, adding information about the new SDK to the SDK database, wherein the SDK repository publishing the new SDK in a manner enabling usage of the new SDK in programs.

Optionally, said adding comprises: analyzing a binary file associated with the new SDK to identify execution units of the SDK; and updating the SDK database to reflect the identified execution units are associated with the new SDK.

Optionally, said adding comprises: creating a new program invoking one or more execution units of the new SDK; compiling the new program to create a new executable, wherein the new executable is the binary file associated with the new SDK.

Optionally, the binary file associated with the new SDK is a binary of the SDK.

Yet another exemplary embodiment of the disclosed subject matter is an apparatus for preparing a program for analysis, wherein the program is configured to use one or more Software Development Kits (SDKs), wherein the program is configured to invoke execution units, wherein a portion of the execution units are SDK execution units that are comprised by the one or more SDKs, wherein said apparatus comprising a processor and a memory, wherein said processor is configured to perform the steps of: obtaining symbols of execution units that are potentially invoked by the program during execution; querying, using the symbols, an SDK database to identify the SDKs used by the program; and compiling a set of addresses within the executable that are attributable to the one or more SDKs, wherein each address is identified as associated to a particular SDK; whereby during execution of the program, a stack trace of the execution can be analyzed and addresses obtained therefrom compared to the set of addresses in order to identify an SDK execution unit and its corresponding SDK.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1A:
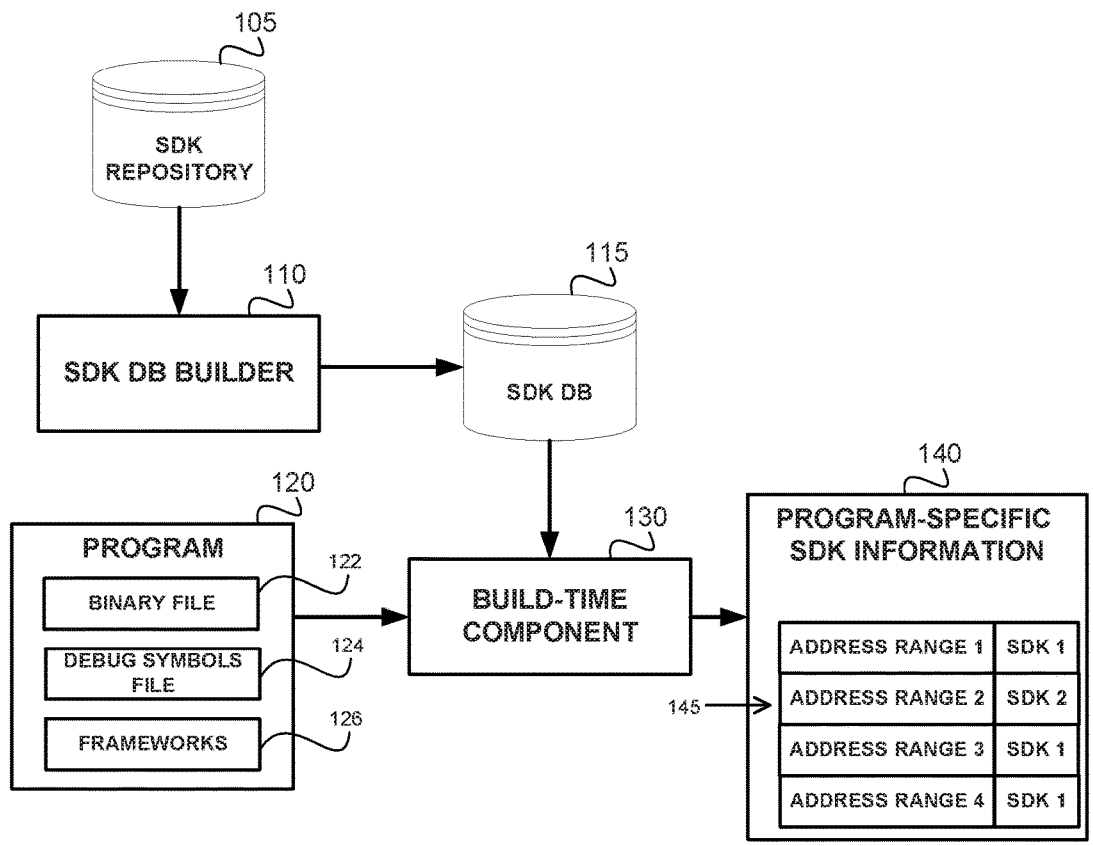
FIGS. 1A-1B show illustration of computerized environments, in accordance with some exemplary embodiments of the disclosed subject matter.

One technical problem dealt with by the disclosed subject matter is to provide developers with a capability to monitor behavior of third-party SDKs integrated into their programs. In some exemplary embodiments, it may be desired to provide developers with a capability to see how the SDKs behave in their program across all their users' base. Additionally or alternatively, developers may be interested in receiving data relating to which SDK causes their program to crash, which system calls the SDKs make; which resources are accessed by the SDKs during runtime, how the SDKs affected power usage (e.g., battery drainage), performance (e.g., launch time of the program), or other metrics; or the like.

Another technical problem dealt with by the disclosed subject matter is to provide a means for identifying and differentiating between the different third party SDKs inside a program, and being able to determine which SDK has performed certain operations, which SDK has caused a crash, or the like. It may also be desired to differentiate between developer's code and SDKs' code, when reporting program crash and for monitoring usage of the execution platform's resources.

While SDKs allow developers to enrich their programs by adding essential functionality, such SDKs may provide disadvantages. SDKs may add code and complexity to the program. As a result, SDKs sometimes cause the program to crash, and because of limited visibility of SDK developers to crash reports caused by the SDK such crashes may take time until they get fixed. SDKs may generate additional network calls, causing more network traffic and adversely affecting battery life. Some SDKs may access device location services, resulting in battery drain as well as causing potential privacy issues. Some SDKs may perform malicious activity, such as by accessing and taking advantage of private user data without the developer of the program being aware of such activity. SDKs may slow down application launch time.

One technical solution is to utilize a stack trace of the execution of the program to determine which execution unit is responsible for an activity. In is noted for the sake of clarity that in the present disclosure term "execution unit" refers to any software component that is executable, such as a function, a method, or the like, and does not relate to ant hardware component. The stack trace may comprise addresses of execution units, such as static functions, class methods, system calls, library functions, or the like, in the call stack at a certain point in time during execution of the program. In some cases, a function may invoke system calls, library functions of standard libraries, or the like. As a result, the top of the stack may point to an execution unit that is neither part of the developer's code, nor part of an SDK code. Such code may be referred to as system code. System code may invoke other system code. In order to identify whether the system code was invoked by the developer's code or by an SDK's code (and to identify which SDK), the content of the stack trace may be analyzed. In some exemplary embodiments, the stack trace may be analyzed in a Last-In First-Out (LIFO) order until a first execution unit that is identified as either part of an SDK's code or a part of the program's code is identified. In some exemplary embodiments, the stack trace may identify a name of an execution unit and the identity of the SDK may be ascertained from its name. However, in some cases, such as in the popular iOS™ operating system from APPLE™, the name itself may not identify the SDK. In such a case, an address of the execution unit within the executable may be identified and compared to a predetermined set of addresses, that has been a-priori compiled. Each address range may be identified with an SDK. Based on the comparison, it may be determined whether the execution unit is part of an SDK, and the identity of such SDK.

Additionally or alternatively, the stack trace may be analyzed in a LIFO order until reaching a first SDK execution unit, or until reaching the end of the stack. Additionally or alternatively, the stack trace may be analyzed in LIFO order from top to bottom, identifying each SDK execution unit in the stack trace. In some cases, more than a single SDK may be identified in the stack trace. Such may be the case if one SDK invokes another SDK. As an example, if a first SDK initiates a call to a second SDK, the call stack trace may comprise an execution unit of the second SDK in a higher location than the execution unit of the first SDK. The higher execution unit may be deemed as the SDK responsible for the activity monitored. However, such may not always be the case. For example, a first SDK may swizzle network calls, and therefore a network call which was initiated by a second SDK may appear in the stack trace as associated with the first SDK. In the stack trace, the execution unit of the first SDK may appear in a higher location than the execution unit of the second SDK. However, the SDK responsible for the activity (e.g., the network call) is the second SDK. As another example, a first SDK may call a callback function of an app, and the app may invoke a second SDK. The highest SDK on the stack will be the first SDK. However, the SDK responsible for the activity, is the second SDK. In some exemplary embodiments, by analyzing the SDK execution units and their relation it may be determined whether the last execution unit (i.e., highest in the stack) is the one responsible for the activity or another SDK due to the use of swizziling mechanism, callbacks, or the like.

In some exemplary embodiments, the analysis may be performed based on a stack trace representing a crash state of the program. The stack trace may be analyzed at the time of the crash (e.g., using an exception handler for catching the crash event and handling such event), or at a later time, such as at a next launch of the program (e.g., by analyzing a dump file created at the crash time). Based on the analysis, a report may be sent to a server to provide crash-related information to the developer. In some exemplary embodiments, the developer may review an aggregated report based on reports received from different user devices indicating which code section caused the crash, thereby allowing the user to identify SDKs that disrupt the user experience of her program.

In some exemplary embodiments, the analysis may be performed during attempts of the program to access restricted resources, such as private data, GPS information, accelerometer readings, accessing network, or the like. Under some operating systems, a program may receive permissions to access certain resources of the operating system, without differentiating between access made by SDK's code and access made by developer's code. A mechanism for differentiating between such accesses and providing a fine-granularity of permissions is disclosed in U.S. Patent Publication No. 2016/0,246,594, entitled METHOD AND SYSTEM FOR CONTROLLING INTEGRATED SOFTWARE COMPONENTS, filed on Feb. 25, 2015, which is hereby incorporated by reference in its entirety for all purposes without giving rise to disavowment. In some exemplary embodiments, a system call which utilizes a resource of the execution platform is hooked, such as using instrumentation, to analyze the call stack as appearing at that time of execution. By performing such analysis, it may be determined whether the SDK or the developer's code is responsible for the resource utilization.

In some exemplary embodiments, the information is analyzed and sent to a server. The server is accessible to the developer, such as using a web-based User Interface (UI) and enables her to review SDK's causing her program to crash, SDK's utilization of resources, or the like.

In some exemplary embodiments, the predetermined set of addresses may be compiled at build-time of the program, using the executable file itself as well as additional files, such as debug symbols file which can be created during compilation. In some exemplary embodiments, a debug symbol may be information that expresses which programming-language constructs generated a specific piece of machine code in a given executable module. The symbolic information may be compiled together with the module's binary file, or distributed in a separate file, or simply discarded during the compilation and/or linking. The debug symbols file may be normally used to enable a person using a symbolic debugger to gain additional information about the binary, such as the names of variables and routines from the original source code. In some exemplary embodiments, the debug symbols information may be useful to identify the different execution units and their addresses within the executable. Using such information, SDK execution units, developer execution units and system execution unit may be differentiated. In some exemplary embodiments, at build-time, a symbol table and an executable file of the program may be analyzed to identify the different execution units. It will be noted that "build-time" may include compilation and linkage time, as well as periods of time thereafter, prior to distribution of the executable file to users (e.g., using APPLE STORE™ or similar application stores).

In some exemplary embodiments, during the analysis of the executable it may not be a-priori known which SDKs are used by the executable. An SDK database may be compiled, comprising information about each SDK and its execution units. The SDK database may be queried, based on the execution units identified in the executable of the program and their respective symbols. In some cases, two or more SDKs may use the same name for an execution unit and therefore the query may be ambiguous. Additionally or alternatively, a single SDK may be identified, however, the execution units may be defined by the developer herself. The selection of the SDK may be performed heuristically between the different options. In some exemplary embodiments, the heuristic selection may be based on classes, methods, categories, functions, dynamically linked libraries (e.g., dynamic frameworks in iOS™, Dynamic Linked Libraries (DLLs) in Windows™, shared objects in Linux™, or the like, referred to herein below as "dynamic frameworks", or "frameworks"), or other constructs, not necessarily execution units, appearing in the executable of the program and defined by each SDK. For example, if one SDK comprises ten execution units, out of which 8 were identified in the executable, and another SDK comprises ten execution units, out of which 2 were identified in the executable, it is more likely that the first SDK is used by the program rather than the second one. As another example, if only a single SDK is matched, however, out of the ten classes it defines, only one appears in the executable, and only one method of the three methods of that class are found in the executable, and all other classes, categories, functions, methods and frameworks do not appear in the program, it may be heuristically determined that the execution unit is a developer execution unit. In some exemplary embodiments, the identification process may be performed iteratively each time analyzing the top-matched SDK. For example, assuming there is a match of 70% of the constructs of SDK1, 60% of those of SDK2 and 80% of those of SDK3, then SDK3 may be identified first. After such identification, the constructs associated with SDK3 are removed from the potential matching, thereby potentially reducing the matching relation. For example, after removing the constructs of SDK3 from the equation, SDK1's matching ratio may be reduced to 5%. As a result, SDK 2 may be first analyzed prior to analyzing SDK1. After which, SDK1 may be analyzed and it may be decided that SDK1 is not included due to its low ratio between the number of constructs it defines and the number of corresponding constructs found in the program. In some cases, a ratio below a predetermined threshold may be indicative that the SDK is not included in the program.

Additionally or alternatively, the program instructions themselves may be compared explicitly or implicitly, to identify the correct execution unit. In some exemplary embodiments, a Cyclic Redundancy Check (CRC), MD5 hash or other encoding may be used to select between different options. In some exemplary embodiments, the instruction set of the execution unit may be grouped and encoded to return an encoded value which is considered relatively unique. It is unlikely that the encoding will be the same for two different execution units having the same name. Hence, the selection is made by implicitly comparing the instructions using their proxy—an encoded version thereof. Additionally or alternatively, the instructions may be compared explicitly to identify the correct execution unit in the SDK database between the different options.

In some exemplary embodiments, the SDK database may be automatically maintained, based on an SDK repository. The SDK repository may be a repository accessible to developers and comprising the SDKs that the developers may use. The SDK database may comprise metadata information about the SDKs in the SDK repository. In some exemplary embodiments, the SDK database may be compiled based on several SDK repositories. In some exemplary embodiments, manual operation may be performed, such as to introduce SDKs that do not appear in a public repository and which can be obtained from the SDK developer. In some cases, the SDK may be obtained manually and automatically processed similarly to automatically-obtained SDKs. Once a new SDK is obtained, information about the new SDK is created automatically and added to the SDK database. The information may include the name of the SDK, the names of the execution units, or the like. In some exemplary embodiments, in response to the identification of a new SDK, a dummy program is automatically built which uses the SDK. The dummy program may be compiled and analyzed to identify the execution units thereof. The SDK database may be updated based on the identified execution units appearing in the dummy program.

In some cases, a first SDK may use a second SDK. In such a case, the new program may therefore include the execution units and other constructs defined by both SDKs. If the second SDK is already in the SDK database (e.g., it was analyzed before analyzing the first SDK), the automated process may heuristically identify the inclusion of the second SDK, as its footprint may appear in the program: its classes, methods, categories, frameworks and other constructs may be included in the executable due to their indirect inclusion. Additionally or alternatively, after the identification of the inclusion of the second SDK is performed, its constructs appearing in the executable may be identified and disregarded so as not to be identified as associated with the first SDK. Additionally or alternatively, the SDK database may be updated to indicate the inclusion relationship between the first SDK and the second SDK. In some cases, inclusion information may be useful in heuristically identifying SDKs in a program. As an example, if the second SDK's constructs do not appear in the executable it is unlikely that any construct identified belongs to the first SDK. As another example, if the second SDK is identified, and the first SDK is a potential fit, the heuristic choice may be biased towards selecting the first SDK.

One particular embodiment of the disclosed subject matter relates to mobile apps, and in particular to mobile apps developed over the iOS™ operating system, provided by APPLE™. Although the specification below may focus on such embodiment, the disclosed subject matter is not limited to this particular setting.

Referring now to FIG. 1A showing a computerized environment, in accordance with some exemplary embodiments of the subject matter.

SDK DB Builder 110 may be a computerized device, such as implemented by software and hardware, or the like, configured to monitor SDK Repository 105 and update SDK DB 115 accordingly. SDK Repository 105 is a repository offering SDKs to be used by developers, such as CocoaPods™. In some exemplary embodiments, several SDK repositories may be monitored.

SDK DB Builder 110 may be periodically executed, or alternatively, may be continuously active so as to provide immediate response to any SDK identification. SDK DB Builder 110 may be configured to continuously build the SDK DB 115 and keep it up-to-date. In some cases, SDK DB Builder 110 may update SDK DB 115 when a new version of an SDK is released by treating such release as a new SDK.

SDK DB 115 may be a database which retains meta-data on SDKs. The meta-data may be information useful to identify the code belonging to each SDK, such as the names of all classes of the SDK, methods in the classes, categories in the SDK and methods thereof, functions defined in the SDK, or the like.

Build-Time Component 130 may be configured to analyze a Program 120 at build-time and generate Program-Specific SDK Information 140. The Program-Specific SDK Information 140 may be information useful to analyze a call stack of an execution of Program 120 to determine whether an operation resulted from an SDK invoking the operation or directly from a developer's code. In some cases, the Program Specific SDK Information 140 may be included within the Program 120 when distributed, such as by adding it to the distribution package, by modifying Program 120 to create a modified Program 120, or the like. Additionally or alternatively, the Program Specific SDK information 140 may be sent to a server (not shown), and may be obtained from the server in runtime.

In some exemplary embodiments, Build-Time Component 130 may be configured to scan a Binary File 122, a Debug Symbols File 124, Frameworks 126, and source code of Program 120 (not shown), or any combination thereof. Based on the scanning a set of all components of Program 120 may be produced, together with their respective addresses within Binary File 122. The components may be compared against SDK DB 115 in order to classify each component as relating to developer's code or specific SDKs. In case of ambiguity, deeper analysis may be performed, such as based on assembly code, CRC encoding of the component, or the like. Additionally or alternatively, heuristics may be employed such as biasing towards SDKs based on matching of other components (e.g., methods, classes, or the like).

In some exemplary embodiments, Program 120 may comprise Binary File 122, which is the executable file of Program 120. Debug Symbols File 124 (e.g., dSYM) may be a file containing symbols and names of constructs that are used in the Binary File 122. In some exemplary embodiments, the debug symbols may be stripped from the Binary File 122 so as to increase complexity of disassembling Program 120 or hacking it, to reduce the size of the executable, or the like. In some cases, the debug symbols may be preserved within the executable, and not separated by the compiler. In some exemplary embodiments, Debug Symbols File 124 may comprise address ranges of compilation units of Binary File 122.

In iOS™ programming, some SDKs may arrive in the form of dynamic Frameworks 126. Frameworks 126 may be scanned in order to detect additional SDKs. In this process, system frameworks may be filtered out. In some exemplary embodiments, For SDKs that come as dynamic frameworks, it may be sufficient to store the association of the framework name to the SDK as part of Program-Specific SDK Information 140. Additionally or alternatively, as some frameworks may include two or more SDKs, the binary of the framework (e.g., dylib in iOS™) may be processed similarly to the processing of Binary File 122 to identify which portions are associated with which of the two or more SDKs.

Program-Specific SDK Information 140 may comprise Address Table 145 identifying addresses in Binary File 122 and their associated SDK. In some exemplary embodiments, Address Table 145 may relate to address ranges as a whole. In some exemplary embodiments, the Binary File 122 may be scanned for execution units, such as methods, functions, or the like. If an address of an SDK execution unit is within an address range of the compilation unit, the entire range may be identified as relating to the SDK. In some cases, the address of the SDK execution unit may not be found within any of the compilation units, a situation which may occur, for example, when static SDK frameworks are compiled without debug information. In such a case, the single address of the SDK execution unit may be individually mapped. Additionally or alternatively, each SDK execution unit's address may be mapped individually regardless of the address ranges of the compilation units.

Figure 1B:
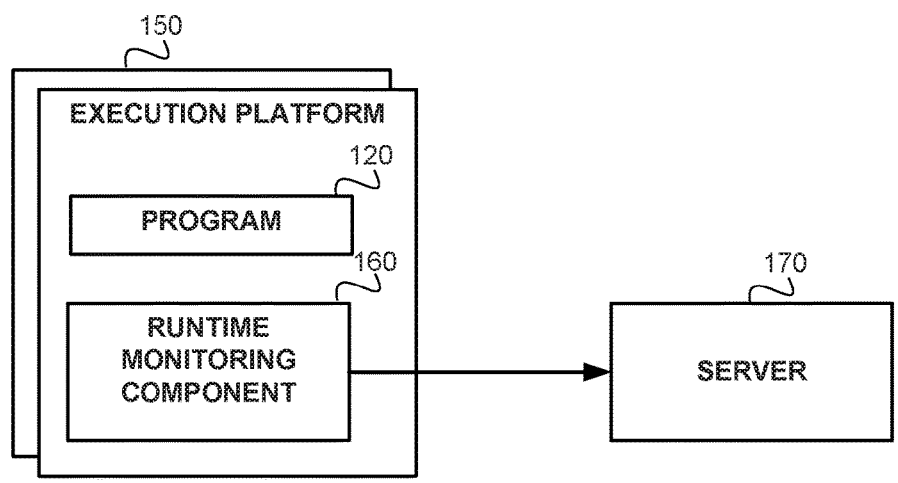

Referring now to FIG. 1B showing a computerized environment, in accordance with some exemplary embodiments of the subject matter.

Execution Platform 150, such as a user device, a laptop computer, a smartphone, a mobile phone, a tablet computer, or the like, may execute Program 120. Runtime Monitoring Component 160, which may or may not be part of Program 120 itself, may be configured to analyze runtime information and send reports to Server 170 over a computerized network, such as the Internet.

It will be noted that Program 120 may be executed by many different Execution Platforms 150 and their reports may be sent to Server 170. Server 170 may aggregate the information obtained from the different Execution Platforms 150 to provide a report relating to the operation of Program 120 on various devices, such as to enable developer to analyze the behavior and effects of the SDKs employed in her Program 120.

Runtime Monitoring Component 160 may be configured to monitor SDK activity in real-time. Monitoring the SDK activity may involve hooking system calls, such as by means of instrumentation, "swizzling", or any other hooking mechanisms, to replace the original code with a new code that checks which SDK has made the call based on the call stack and then invoking the original system call. Additionally or alternatively, crash handlers may be added to capture crashes. Additionally or alternatively, Runtime Monitoring Component 160 may be configured to load a previously created dump file upon execution of Program 120, or access a server and download information therefrom, so as to allow analysis of a crash of Program 120 without using crash handlers. It will be noted that the monitoring activity may be performed by dedicated code which may be injected at runtime at the Execution Platform 150, or included in the distributed Program 120, such as after being added by Build-Time Component 130.

In some exemplary embodiments, Runtime Monitoring Component 160 may be included in Program 120. The developer may embed the Runtime Monitoring Component 160 herself if she would like to activate the functionality provided by such component. Additionally or alternatively, Program 120 may be automatically modified, such as during build-time, to also include Runtime Monitoring Component 160.

Figure 2:
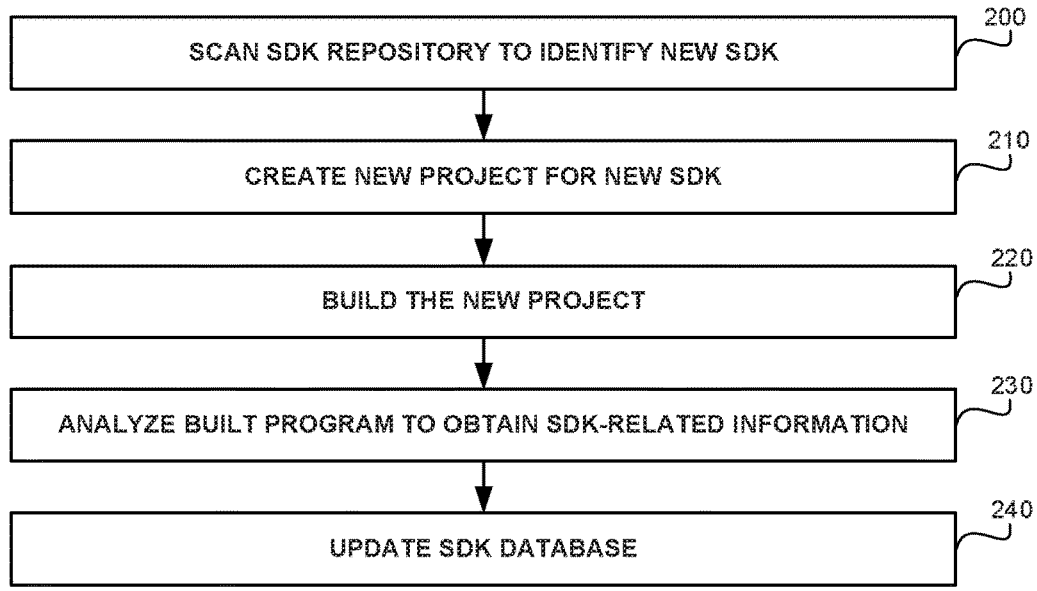
FIG. 2 shows a flowchart diagram of a method, in accordance with some exemplary embodiments of the disclosed subject matter.

Referring now to FIG. 2 showing a flowchart diagram of a method, in accordance with some exemplary embodiments of the disclosed subject matter.

On Step 200, SDK Repository may be scanned to identify a new SDK. In some cases, a new released version of an existing SDK may be considered as a new SDK.

On Step 210, a new project may be created for the new SDK. The new project may be an empty project with no user-specific code which includes the new SDK. In some cases, the new project may consist of some predetermined template code, such as a main( ) function with a limited functionality (e.g., "hello world" program). If the template code comprises classes and methods, such information is retained to allow for later filtering out the classes and methods which resulted from the template code and not from the new SDK. in iOS™, an empty Xcode™ project may be created and updated to include the template code. A Podfile may be generated, such as by invoking "pod install", to include the new SDK in the new project.

On Step 220, the new project may be built. The code of the new project may be compiled and linked to create an executable file, dynamically linked libraries, or the like. The new program that is created thereafter is a program which includes the code of the SDK.

On Step 230, the built program is analyzed to obtain SDK-related information. In some cases, the binary file may be analyzed as well as frameworks associated with the build program.

In some cases, such as in iOS™ environment, the binary may contain a lot of information on the SDK, including classes and methods (residing in various objective-C™ runtime sections of the binary file), symbols in symbol table, code in the text segment etc. third party dynamic frameworks should also be scanned.

In some cases, in Step 230 some constructs may be filtered out from analysis, such as constructs associated with the template code, system constructs, or the like.

On Step 240, the SDK database, such as 115 of FIG. 1A, may be updated. The information gathered on the constructs of the SDK may be stored in the SDK database, allowing for future use of such information to identify SDK usage in the programs.

In some cases, SDK dependencies should be taken into account. In some cases, an SDK may require another SDK which it is dependent on, in which case the outcome of the build will contain information on two or more SDKs. In some cases, the dependent SDKs may be analyzed alone, and therefore it may be possible to separate the information of the dependent SDKs from that of the SDK being analyzed, so as to classify the correct information per SDK.

In some exemplary embodiments, a new SDK may be analyzed without creating a new project. As one example, if a source code of the SDK is provided, the source code may be parsed to identify the different constructs defined by the SDK directly. As another example, if the SDK is distributed in binary form, the SDK binary itself may be scanned and analyzed instead of the built program in Step 230. It will be noted, however, that by creating the new project and analyzing its binary, SDKs that are provided in different forms (e.g., binary or source code) are analyzed in the same manner, reducing the likelihood of erroneous different analysis to different forms.

Figure 3:
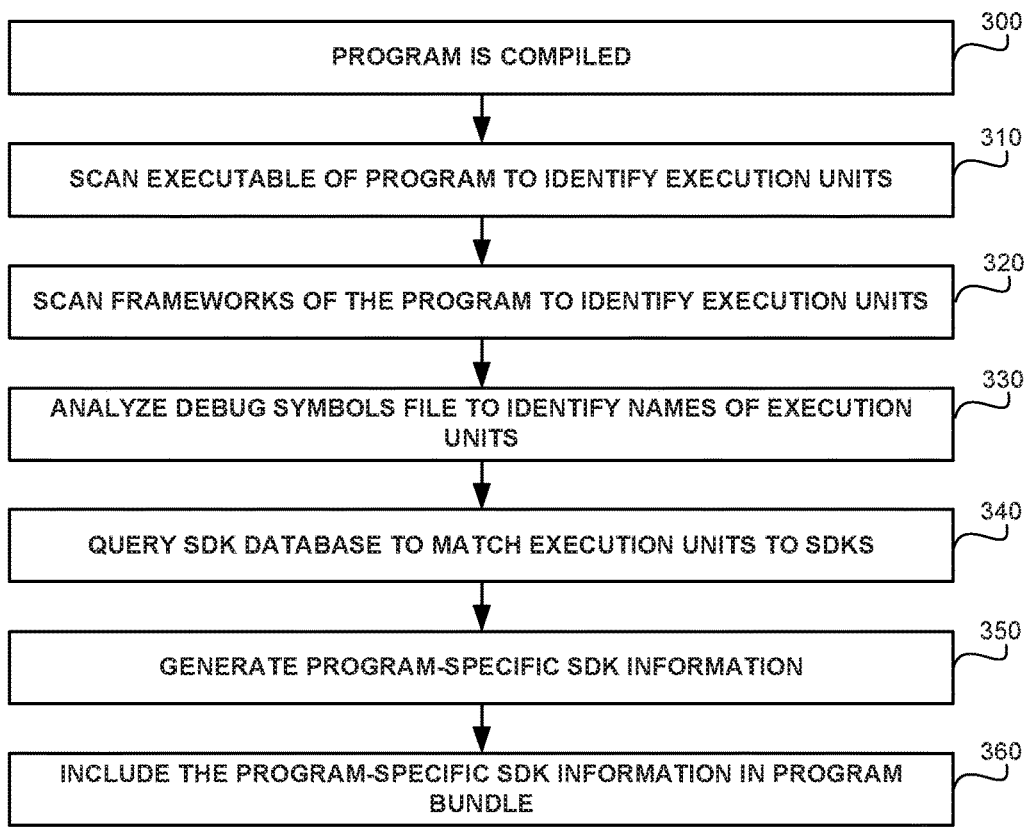
FIG. 3 shows a flowchart diagram of a method, in accordance with some exemplary embodiments of the disclosed subject matter.

Referring now to FIG. 3 showing a flowchart diagram of a method, in accordance with some exemplary embodiments of the disclosed subject matter. In some exemplary embodiments, the method of FIG. 3 may be performed at build-time and before distribution of the program to users.

On Step 300, the program is compiled to produce an executable binary.

On Step 310, the executable is scanned to identify execution units of the program, such as methods of classes, methods of categories, functions, or the like. in iOS™ the binary may comprise relevant sections that can be scanned, such as but not limited to: Symbol table section; String table section; _objc_classlist section (holds pointers to classes); _objc_data section (classes & meta classes information); _objc_const section (class definitions, method definitions and addresses, categories); _objc_classname section (class names); _objc_methname section (method names); _objc_catlist section (categories); and _text section (the assembly code). By scanning these sections of the executable, a map of all classes, methods, categories, functions of the app can be generated.

On Step 320, dynamic frameworks of the program may be scanned. Some SDKs may be distributed in the form of dynamic frameworks, such frameworks are also scanned to detect SDK-related frameworks. During the scanning for frameworks, system frameworks may be filtered out and ignored.

On Step 330, in case the execution units are not identified by name, such as in case the executable was stripped of debug symbols, the symbols may be obtained from the debug symbols file.

On Step 340, the SDK database, such as 115 of FIG. 1A, may be queried in order to determine which SDKs reside in the program. This may be performed based on class names, method names, categories and frameworks found in the program, and matching them against the SDK database. The result may be a list of SDKs found in the program and a set of classes and categories associated with each SDK. It will be noted that some of the classes and categories may not be associated with any SDK, such as the case with system execution units and developer execution units.

On Step 350, program-specific SDK information, such as 140 of FIG. 1A, may be generated. The program-specific SDK information may comprise information useful for runtime component to identify which SDK issued a call. The program-specific SDK information may comprise addresses within the executable and their association to specific SDKs. In some cases, ranges of compilation units may be marked together, based on information from a debug symbols file. In some cases, addresses of execution units themselves may be identified.

In some exemplary embodiments, after all execution units have been analyzed, the addresses may be sorted and any consecutive address may be merged together to form a range comprising the consecutive addresses.

It will be noted that the use of ranges may reduce overhead, such as in a size of the program-specific SDK information and in the complexity of matching an address to the addresses appearing in program-specific SDK information. In some cases, program-specific SDK information may further include matching of frameworks to SDKs.

On Step 360, the program-specific SDK information may be included in the distributable program. In some cases, the program-specific SDK information may be injected into the binary of the program, such as in text section of the executable. As an alternative example, a static table comprising the information may be injected to the binary to be used by the distributed program. Additionally or alternatively, the program-specific SDK information may be included in the program bundle (e.g., as a resource file that is distributed with the program). Additionally or alternatively, the program-specific SDK information may be downloaded from the server at runtime.

Figure 4:
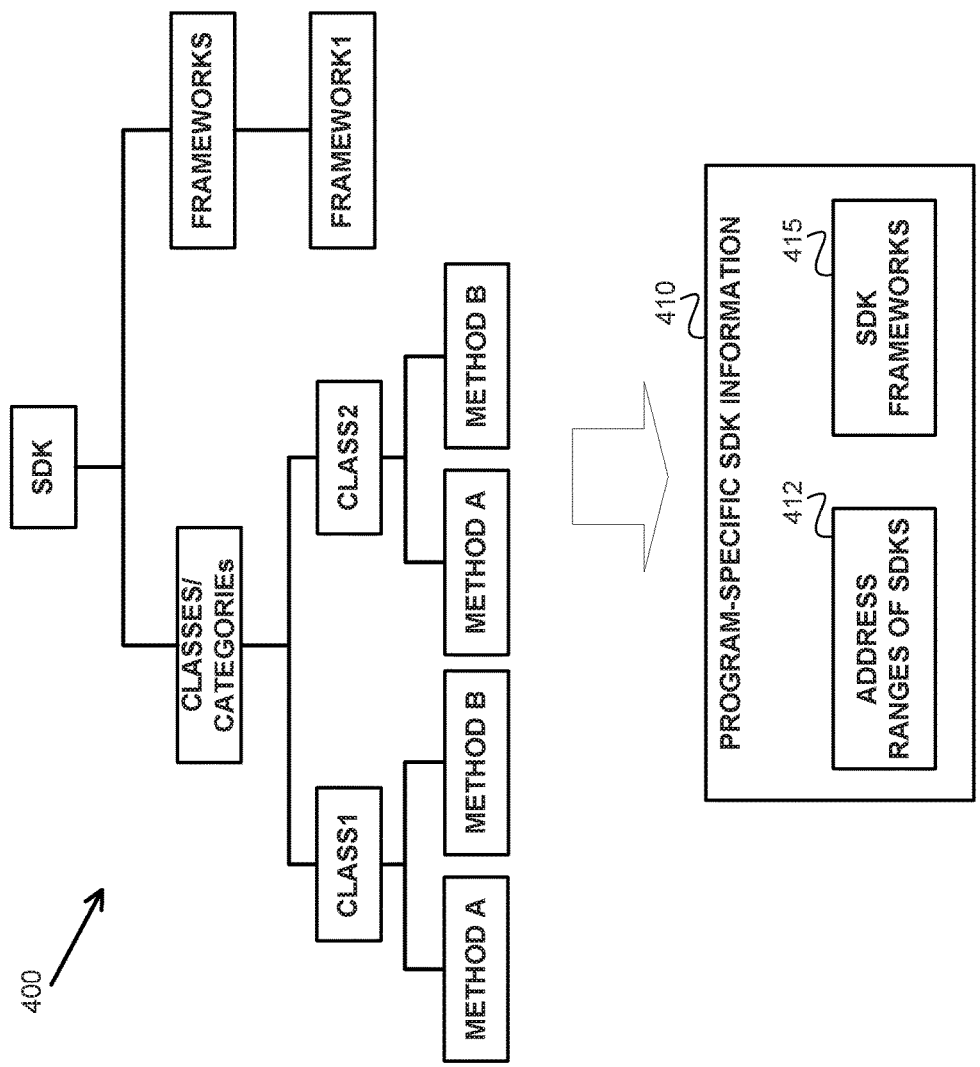
FIG. 4 shows a schematic illustration of SDK components and the program-specific SDK information created based thereon, in accordance with some exemplary embodiments of the disclosed subject matter.

Referring now to FIG. 4 showing a schematic illustration of SDK components and the program-specific SDK information created based thereon, in accordance with some exemplary embodiments of the disclosed subject matter.

SDK Components 400 may include the components identified during the analysis of the program. In particular, it may comprise classes and methods thereof, categories and methods thereof, frameworks, or the like. Based on such information, and using the address ranges of compilation units in the debug symbols file, a set of addresses and their association to the different SDKs may be compiled (412). In some exemplary embodiments, for SDKs that are distributed as dynamic frameworks, it may be sufficient to store the associate of each framework to its SDK (415).

Figure 5A:
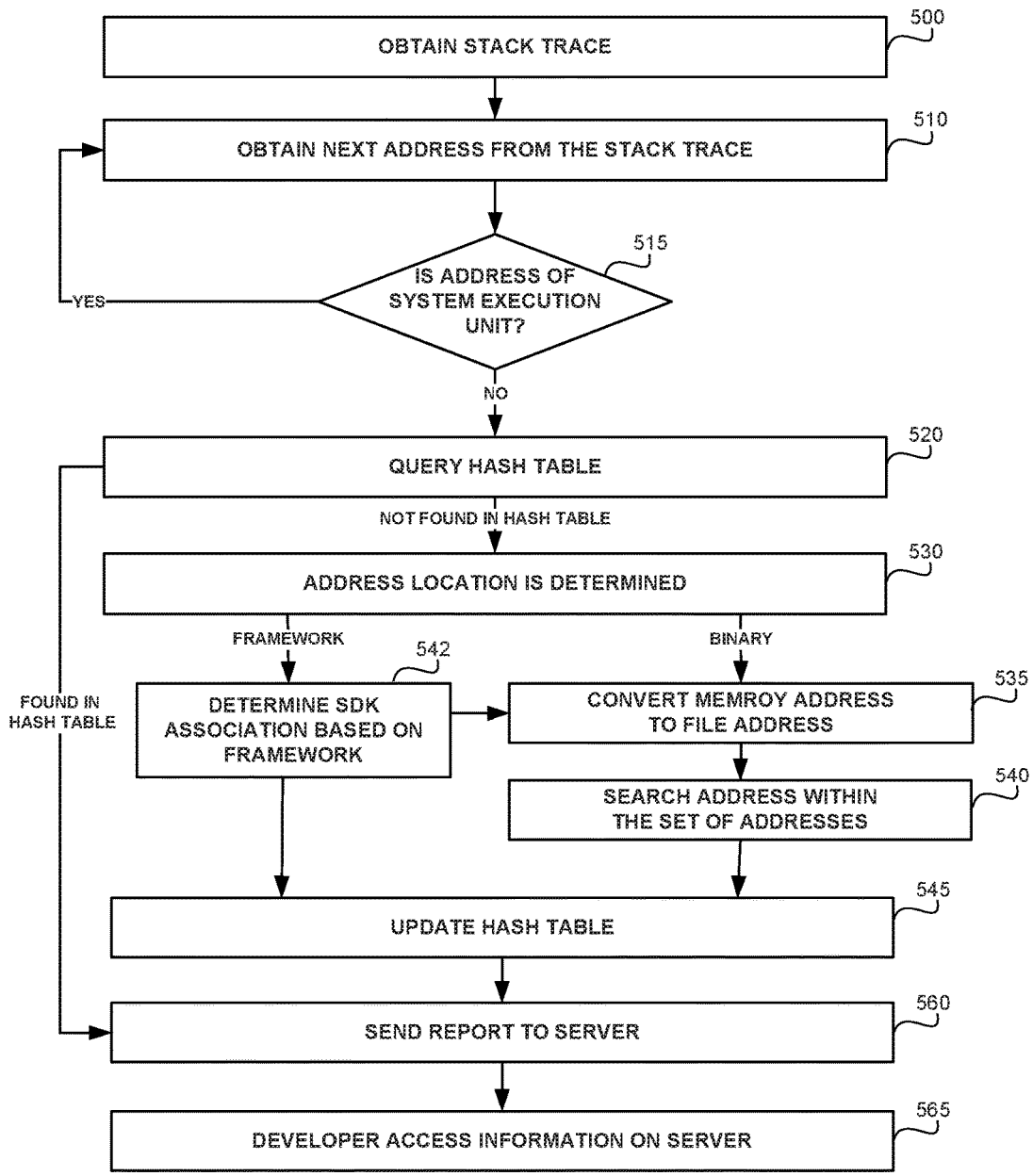
FIG. 5A shows a flowchart diagram of a method, in accordance with some exemplary embodiments of the disclosed subject matter.

Referring now to FIG. 5A showing a flowchart diagram of a method, in accordance with some exemplary embodiments of the disclosed subject matter.

On Step 500, a stack trace may be obtained. The stack trace may represent the state of the call stack at a certain point of the execution of the program, such as but not limited to at a crash of the program, at a utilization of a resource (e.g., querying the GPS of the device, utilizing network connection, accessing contacts on a mobile phone, or the like).

On Step 510, an address may be obtained from the stack trace. The address may be obtained in accordance with the LIFO ordering defined by the stack: starting from the top of the stack and ending at the bottom of the stack. In some exemplary embodiments, the analysis of the stack trace may be performed without modifying the call stack itself to avoid affecting the behavior of the program after the analysis is concluded.

On Step 515, if the address is of a system execution unit, then Step 510 is performed to obtain a next address from the stack. Otherwise, the analysis of the present address continues at Step 520. In some cases, there may be a predetermined set of addresses known to be associated with system execution units.

On Step 520, a hash table is queried to determine whether the address is included in the hash table. The hash table may be a hash table that is maintained by the execution and is dropped for next executions. Additionally or alternatively, the hash table may be retained in the memory of the execution platform for future executions. Additionally or alternatively, the hash table may be retrieved from a server, such as 170 of FIG. 1B, and an update thereof may be transmitted to the server immediately or periodically for distribution. The hash table may provide performance improvement over an implementation lacking the hash table. If the address is found in the hash table, then the SDK that corresponds to the execution unit having the address is indicated in the hash table and is obtained therefrom. Accordingly, Step 560 may be performed. Otherwise, Step 530 may be performed. In some exemplary embodiments, the hash table may also include information regarding addresses of developer execution units and the differentiation between SDK or system may be done in accordance with the content of the hash table, in case there is an entry for the address being analyzed. In some exemplary embodiments, the hash table may refer to file addresses instead of addresses in memory, and the file address may be calculated as is described with relation to Step 535 below.

On Step 530, the address's location is determined. If the address is within the range of addresses of the main image of the program within the application process, then Step 535 is performed. Otherwise, the address is associated with a framework external to the executable, and Step 542 is performed.

On Step 535, memory address is converted to file address. The runtime address in the executed process is different than the address of the instruction in the executable file. In some exemplary embodiments, the file address may be computed using the following formula: FileAddr=StackAddr−LoadAddr+Slide, where FileAddr is the address in the file, StackAddr is the address obtained from the stack, LoadAddr is the address to which the program was loaded, and Slide is an offset value. Other formulas may be used depending on the specifics of the execution platform, the operating system, or the like.

On Step 540, the converted file address is compared to the addresses found in the set of addresses, which can be obtained from the program-specific SDK information retained within the application bundle. If the address is not in the range, it can be determined that the execution unit is a developer execution unit. If the address is in the range, it can be determined that the execution unit is an SDK execution unit and the identity of the execution may also be ascertained. In some exemplary embodiments, in order to improve performance, a binary search of the set of addresses may be performed. For such a purpose, the set of addresses may be sorted when created.

On Step 542, the dynamic framework is analyzed to determine to which SDK, if any, it is associated, in accordance with the program-specific SDK information. In case the dynamic framework comprises more than a single SDK, then Steps 535-540 may be performed. In such a case, there may be a set of addresses defined for the binary of the framework which is analyzed at build time and is usable at runtime.

On Step 545, the hash table may be identified based on the determination. In some exemplary embodiments, only SDK related addresses are inserted together with an identification of the SDK to which it belongs. In other embodiments, addresses of developer execution units are also included in the hash table with appropriate identification.

On Step 560, based on the determination, a report may be transmitted to a server. In some cases, the report may be transmitted immediately. Additionally or alternatively, batch transmission may be performed potentially including several separate reports. In some cases, the reports may be reports indicating which SDK caused a crash. In other cases, the reports may be reports indicating which SDK utilized a resource and which resource was utilized.

On Step 565, the developer may access the information in the server to review the aggregated information. Using the aggregated information, the developer may identify potential stability issues arising from SDKs, which may have not materialized in the testing phase before deployment. Additionally or alternatively, the developer may identify potential security breaches performed by the SDK compromising the users of the program and the developer's ability to be included in an official program store, such as an application store for mobile apps. Other violations of store policies may be identified using the aggregated monitored information. Based on such information, the developer may update her program to stop using a compromised SDK or partially block the SDK from accessing a compromised resource.

Figure 5B:
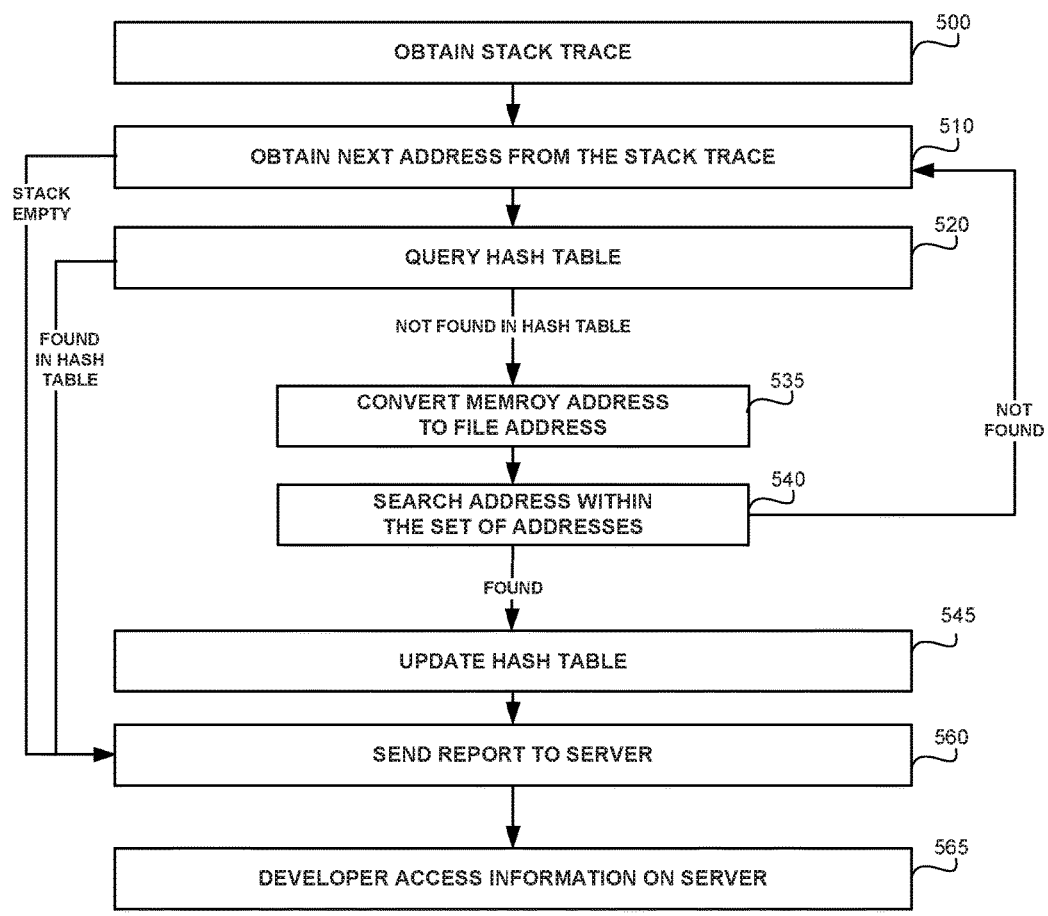
FIG. 5B shows a flowchart diagram of a method, in accordance with some exemplary embodiments of the disclosed subject matter.

Referring now to FIG. 5B, showing a flowchart diagram of a method, in accordance with some exemplary embodiments of the disclosed subject matter. In the method of FIG. 5B, the automated process does not identify system execution units. The stack trace is obtained and iterated entirely until either reaching a first identified SDK execution unit, or until the entire stack has been processed (i.e., reaching the bottom of the stack). In some exemplary embodiments, if no SDK execution unit is identified it may be assumed that the execution has resulted from developer execution unit. In some exemplary embodiments, if SDK execution unit is identified, a report is transmitted to server (560). In some exemplary embodiments, in case no SDK execution unit is identified, a report may be send (560) to provide for general information (e.g., a total number of crashes, useful for showing a percentage of crashes that are caused by each SDK; a total number of GPS requests made by the program, useful for showing a percentage of the GPS requests that were issued by each SDK). Additionally or alternatively, the report may be skipped in such a case.

Figure 5C:
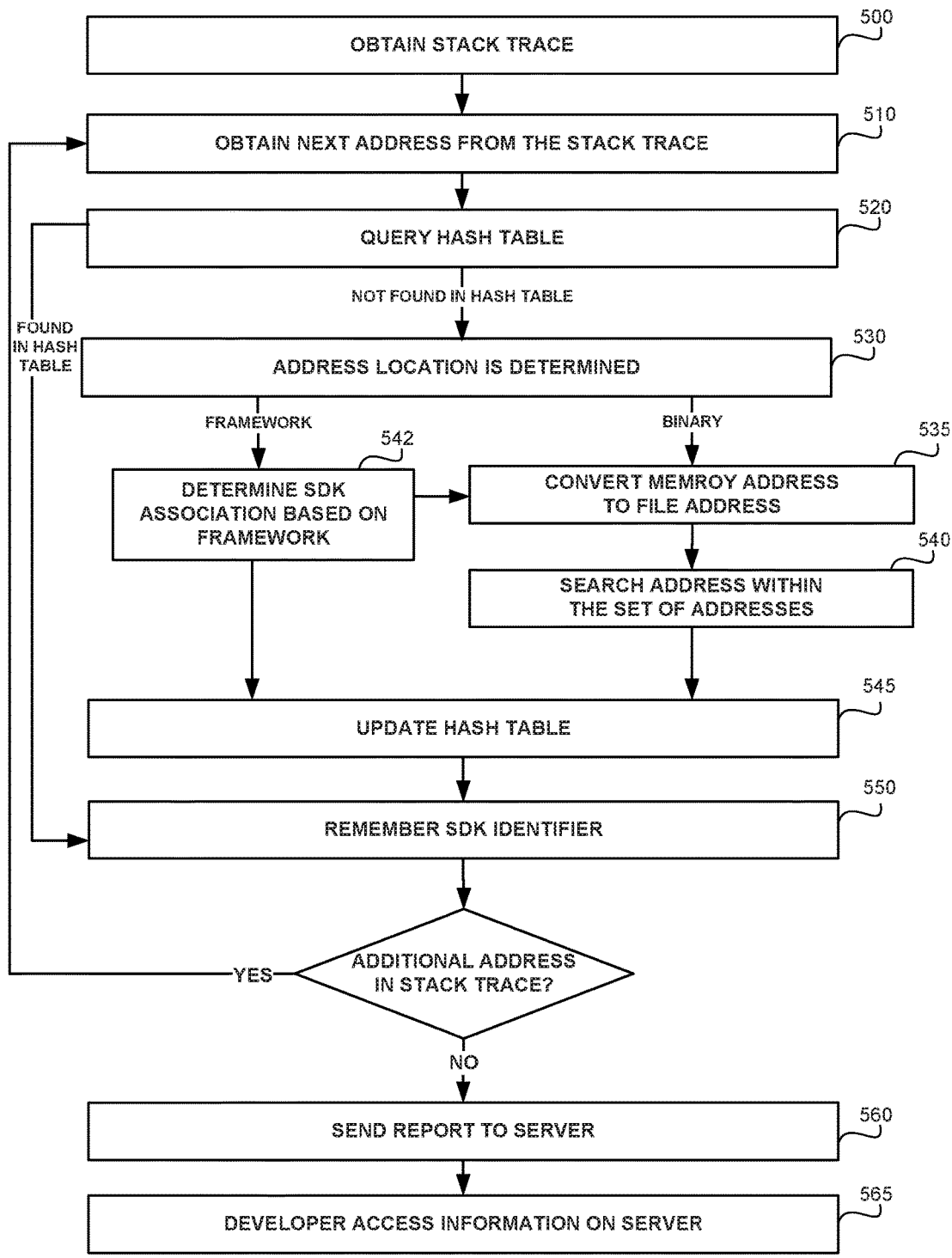
FIG. 5C shows a flowchart diagram of a method, in accordance with some exemplary embodiments of the disclosed subject matter.

Referring now to FIG. 5C, showing a flowchart diagram of a method, in accordance with some exemplary embodiments of the disclosed subject matter. In the method of FIG. 5C, the automated process does not identify system execution units and the stack trace is iterated entirely. After an SDK execution unit is identified—either in the binary (540) or as part of the framework (542)—the SDK identifier is remembered (550), such as using a temporary variable. If during the iteration another SDK is identified, on Step 550 it may be determined whether to replace the SDK identifier with the newly identified SDK. If the newly identified SDK is deemed as the one responsible for the activity of the program, the SDK identifier is updated. As an example, if the first identified SDK is identified based on a swizzled or instrumented method implemented by the first identified SDK, the newly identified SDK may be deemed as responsible for the activity instead of the first identified SDK. On Step 660, a report is sent using the remembered SDK identifier of Step 550.

Figure 6A:
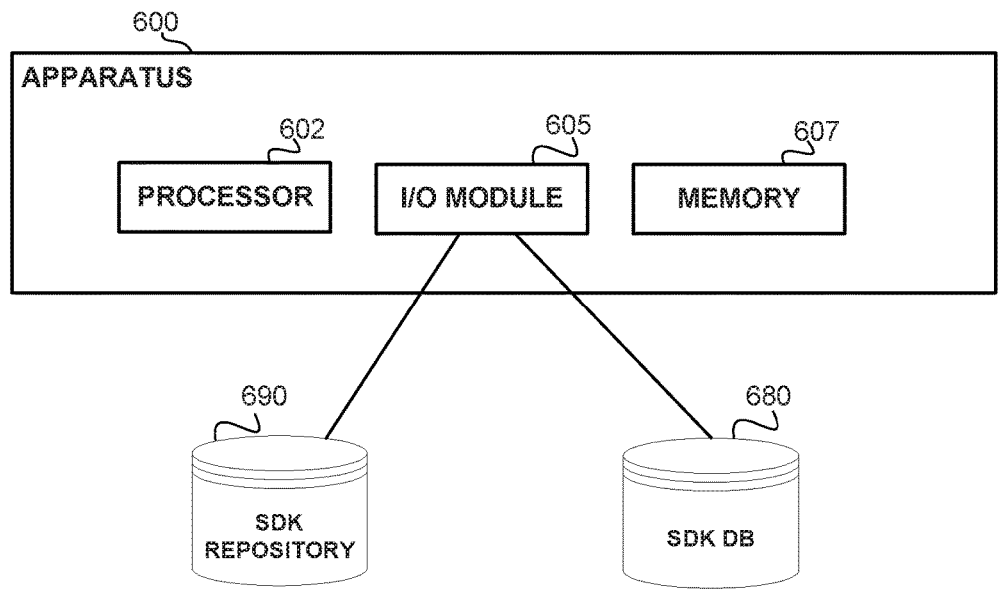
FIG. 6A shows an apparatus, in accordance with some exemplary embodiments of the disclosed subject matter.

Referring now to FIG. 6A showing an apparatus in accordance with some exemplary embodiments of the disclosed subject matter. An Apparatus 600 may be configured to perform the Steps of FIGS. 2 and 3.

In some exemplary embodiments, Apparatus 600 may comprise one or more Processor(s) 602. Processor 602 may be a Central Processing Unit (CPU), a microprocessor, an electronic circuit, an Integrated Circuit (IC) or the like. Processor 602 may be utilized to perform computations required by Apparatus 600 or any of it subcomponents.

In some exemplary embodiments of the disclosed subject matter, Apparatus 600 may comprise an Input/Output (I/O) module 605. I/O Module 605 may be utilized to provide an output to and receive input from a user, such as, for example compilation instructions, manual verification of automatic SDK identification from the SDK repository, or the like. In some exemplary embodiments, I/O Module 605 may be useful for querying SDK DB 680, SDK Repository 690, or the like.

In some exemplary embodiments, Apparatus 600 may comprise Memory 607. Memory 207 may be a hard disk drive, a Flash disk, a Random Access Memory (RAM), a memory chip, or the like. In some exemplary embodiments, Memory 607 may retain program code operative to cause Processor 602 to perform acts associated with any of the subcomponents of Apparatus 600. Memory 607 may retain the program, SDK information, program-specific SDK information, or the like.

In some exemplary embodiments, Memory 607 may comprise program instructions useful for performing the steps of the methods depicted in FIGS. 2 and 3. In some exemplary embodiments, the program instruction may be configured to cause Processor 602 to retrieve SDK from SDK Repository 690; generate a new program which utilizes the retrieved SDK; compile the new program, analyze the program to identify program constructs associated with the SDK; and update SDK DB 680 accordingly. In some exemplary embodiments, the program instruction may be configured to cause Processor 602 to analyze a program to identify program constructs therein, such as using the executable file, using the debug symbols file, or the like; to query SDK DB 680 to match each construct to an SDK; to select between potential conflicting matchings; to generate program-specific SDK information; and to include such information in the distributable program.

Figure 6B:
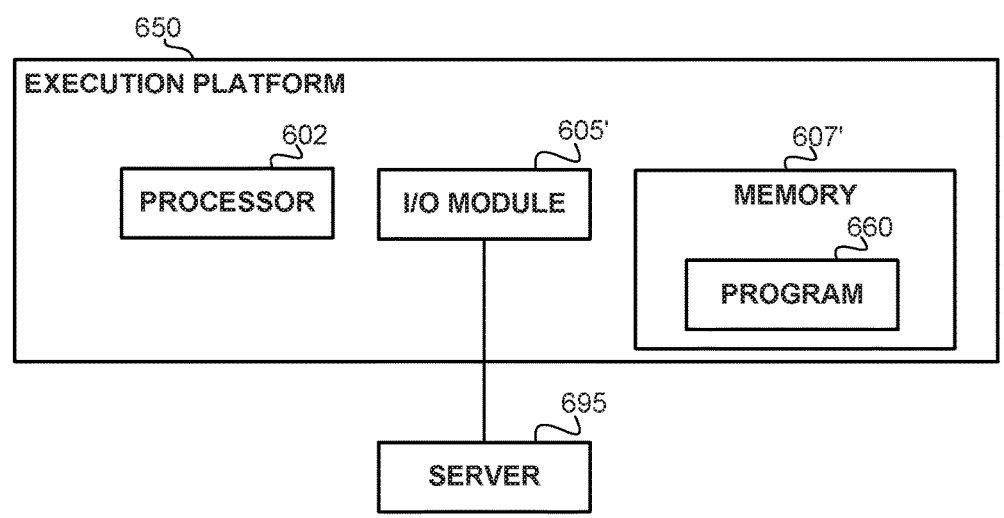
FIG. 6B shows an execution platform, in accordance with some exemplary embodiments of the disclosed subject matter.

Referring now to FIG. 6B showing an execution platform, in accordance with some exemplary embodiments of the disclosed subject matter.

An Execution Platform 650 may be configured to perform the steps of the method depicted in FIG. 5. Execution Platform 650 may be a user device, such as an iOS™ mobile device, a laptop, a personal computer, a tablet computer, or the like. Execution Platform 650 may be configured to execute programs, such as Program 660 retained in Memory 607', similar to Memory 607. Memory 607' may retain, directly as a module separate from Program 660 or indirectly as a part of Program 660, a set of instructions implementing a runtime monitoring component, such as 160 of FIG. 1B.

In some exemplary embodiments, I/O Module 605', similar to I/O Module 605, may enable communication to Server 695, such as for transmitting reports, obtaining program-specific SDK information, if such information is not provided within Program 660, or the like.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer program product for analyzing an execution of a program, wherein the program is configured to use one or more Software Development Kits (SDKs),
    wherein the program is configured to invoke execution units, wherein a portion of the execution units are SDK execution units that are comprised by the one or more SDKs,
    wherein the computer program product comprising a non-transitory computer readable storage medium retaining program instructions, which program instructions when read by a processor, cause the processor to perform a method comprising:
    obtaining a stack trace of the execution of the program, wherein the stack trace comprises addresses, each address is an address of an execution unit by the program having the address;
    iterating over the stack trace to identify an address of an SDK execution unit, wherein said iterating comprises:
    comparing an address from the stack trace to a predetermined set of addresses associated with SDK execution units,
    wherein the predetermined set of addresses is complied prior to said comparing, wherein each address in the predetermined set of addresses is identified as associated to a particular SDK execution unit;
    in response to determining the address is comprised by the predetermined set of address, identifying the address as an address of the SDK execution unit; and
    sending a report to a server, wherein the report identifies an SDK comprising the SDK execution unit, wherein the report is accessible to a developer of the program.

2. The computer program product of claim 1,
    wherein the stack trace is a stack trace depicting a state of the execution that lead to the program crashing;
    wherein the report comprises a crash report, whereby the server gathering from a plurality of instances of the program, crash reports accessible to the developer, whereby SDK-caused crashes are identifiable to the developer.

3. The computer program product of claim 1,
wherein the stack trace is a stack trace depicting a state of the execution prior to accessing a resource of a computation platform executing the program;
wherein the report comprises information regarding resource consumption by the SDK, whereby SDK resource consumption is monitored, whereby the server maintaining an aggregated SDK resource consumption report that is accessible to the developer.

4. The computer program product of claim 1, wherein the predetermined set of addresses associated with SDK execution units are determined at build-time of the program, wherein at build-time, a symbol table and an executable file of the program are analyzed to identify the execution units, wherein each execution unit is analyzed, based on a corresponding symbol of the execution unit, to determine to which SDK the execution unit is associated, if any, wherein the predetermined set of addresses comprises addresses of execution units identified as SDK execution units during build-time.

5. The computer program product of claim 1, wherein said iterating comprises: before performing said comparing, querying a hash table to determine if the address is in the hash table, wherein in response to a determination that the address is in the hash table, obtaining from the hash table, an identification of the SDK, whereby the address is identified as an address of the SDK execution unit without comparing the address with the predetermined set of addresses, whereby reducing overhead of said iterating.

6. The computer program product of claim 1, wherein in response to said determining the address is comprised by the predetermined set of addresses, adding the address to a hash table together with an identification of the SDK.

7. The computer program product of claim 1, wherein two SDK execution units of two different SDKs can potentially have a same name, whereby a name of an SDK execution unit is insufficient to uniquely identify an SDK comprising the execution unit.

8. The computer program product of claim 1, wherein said iterating is performed in a Last-In First-Out (LIFO) order, wherein said iterating comprises: skipping an address of a system call in the stack trace.

9. An apparatus comprising a processor and memory, wherein said memory retaining the computer program product of claim 1.

10. An apparatus for preparing a program for analysis, wherein the program is configured to use one or more Software Development Kits (SDKs), wherein the program is configured to invoke execution units, wherein a portion of the execution units are SDK execution units that are comprised by the one or more SDKs, wherein said apparatus comprising a processor and a memory, wherein said processor is configured to perform the steps of:
obtaining symbols of execution units that are potentially invoked by the program during execution;
querying, using the symbols, an SDK database to identify the SDKs used by the program; and
compiling a set of addresses within the executable that are attributable to the one or more SDKs, wherein each address is identified as associated to a particular SDK;
whereby during execution of the program, a stack trace of the execution can be analyzed and addresses obtained therefrom compared to the set of addresses in order to identify an SDK execution unit and its corresponding SDK.

* * * * *